United States Patent
Hatakeyama

(10) Patent No.: US 6,391,972 B1
(45) Date of Patent: *May 21, 2002

(54) PLASTIC ARTICLES

(75) Inventor: Kazuyuki Hatakeyama, Ichikawa (JP)

(73) Assignee: Heiwa Kagaku Kogyosho Co., Ltd., Ichikawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/397,108

(22) Filed: Sep. 16, 1999

(51) Int. Cl.[7] .......................... C08L 23/00; C08L 23/04
(52) U.S. Cl. .................. 525/191; 525/227; 525/236; 525/240; 525/241; 428/34.7; 428/36.8; 428/515; 428/516; 428/517; 428/518; 428/519
(58) Field of Search .................. 525/227, 240, 525/241, 191, 236; 428/34.7, 36.8, 515, 516, 517, 518, 519

(56) References Cited

U.S. PATENT DOCUMENTS

| | | | | |
|---|---|---|---|---|
| 4,367,312 A | * | 1/1983 | Bontinck et al. | 525/93 |
| 4,918,130 A | * | 4/1990 | Kano et al. | 525/98 |
| 5,085,927 A | * | 2/1992 | Dohrer | 428/220 |
| 5,159,016 A | * | 10/1992 | Inoue et al. | |
| 5,256,734 A | * | 10/1993 | Sugihara et al. | 525/98 |
| 5,986,000 A | * | 11/1999 | Williams et al. | 525/88 |

FOREIGN PATENT DOCUMENTS

| | | |
|---|---|---|
| JP | 9-104176 | 4/1997 |
| JP | 11-5848 | 1/1999 |

* cited by examiner

*Primary Examiner*—Nathan M. Nutter
(74) *Attorney, Agent, or Firm*—Burns, Doane, Swecker & Mathis, LLP

(57) ABSTRACT

It is an object of the present invention to provide a plastic article having moist touch, which differs from the smooth touch peculiar to the conventional plastic articles.

A plastic article is characterized in that the surface of the article is at least partially constituted from a styrenic thermoplastic elastomer, an olefinic thermoplastic elastomer, a blend of a styrenic thermoplastic elastomer and a polyolefin, or a blend of an olefinic thermoplastic elastomer and a polyolefin.

7 Claims, No Drawings

PLASTIC ARTICLES

DETAILED DESCRIPTION OF THE INVENTION

1. [Industrial Field of the Invention]

The present invention relates to a plastic article and more particularly, to a plastic article characterized in that the surface is agreeable to the touch, which differs from the smooth feel peculiar to the conventional plastic articles.

2. [Prior Art]

The surface of a variety of plastic articles, which have conventionally been prepared according to various kinds of molding methods, are usually flat and smooth and therefore, they are very slippery, but there has scarcely been known any plastic article, which has wet feel and good touch or which is agreeable to the touch.

PROBLEMS THAT THE INVENTION IS TO SOLVE

Accordingly, it is an object of the present invention to provide a plastic article possessing the touch, which is quite different from the flat or smooth feel peculiar to the conventional plastic articles.

MEANS FOR SOLVING THE PROBLEMS

According to the present invention, there is provided a plastic article, whose surface is at least partially constituted from a styrenic thermoplastic elastomer, an olefinic thermoplastic elastomer, a blend of a styrenic thermoplastic elastomer and a polyolefin, or a blend of an olefinic thermoplastic elastomer and a polyolefin.

MODE FOR CARRYING OUT THE INVENTION

The inventors of this invention has found that a plastic article constituted from a styrenic thermoplastic elastomer, an olefinic thermoplastic elastomer, a blend of a styrenic thermoplastic elastomer and a polyolefin, or a blend of an olefinic thermoplastic elastomer and a polyolefin has a surface having the touch, which is peculiar to the article and has never been experienced by the conventional plastic articles and have thus completed the present invention based on such a finding.

Examples of the styrenic thermoplastic elastomers used in the invention include styrene-butadiene-styrene block copolymers, styrene-isoprene-styrene block copolymers and styrene-ethylene-butylene-styrene block copolymers and specific examples of commercially available styrenic thermoplastic elastomers are "RABARON (registered trademark)" available from Mitsubishi Chemical Co., Ltd.

Examples of the olefinic thermoplastic elastomers usable in the present invention are ethylene-propylene rubbers and specific examples of commercially available ones include "THERMOLANE (registered trademark)" available from Mitsubishi Chemical Co., Ltd. (which make use of EPM/EPDM as a base polymer).

Moreover, examples of the olefin polymers usable in the present invention are polyethylenes, polypropylenes, or polyethylene-propylene and specific examples of commercially available ones include "CHISSO POLYPRO, Grade: XK6004" available from Chisso Corporation.

In the present invention, the plastic material used for forming at least part of at least the surface of the plastic article of the invention is a styrenic thermoplastic elastomer, an olefinic thermoplastic elastomer, a blend of a styrenic thermoplastic elastomer and a polyolefin, or a blend of an olefinic thermoplastic elastomer and a polyolefin. The rate of the styrenic thermoplastic elastomer or olefinic thermoplastic elastomer with respect to the polyolefin may arbitrarily be changed. For instance, the relative amount thereof may variously be changed in the range of from 100:0 to 1:100, preferably 50:1 to 1:10 and more preferably 10:1 to 1:5, as expressed in terms of the weight ratio. Thus, the present invention permits the preparation of plastic articles possessing the surface having various feel or touch extending from dry touch to relatively moist touch or sticky touch, which have never been achieved by the conventional plastic articles.

As the rate of the styrenic or olefinic thermoplastic elastomer in the blend increases, the touch of the surface of the resulting plastic article is gradually changed from smooth or slippery touch to wet or moist touch. In other words, it gradually becomes hard to cause slippage on the surface. In cases wherein only a styrenic or olefinic thermoplastic elastomer is used or wherein the rate of the styrenic or olefinic thermoplastic elastomer in the blend is extremely high, the resulting plastic article is liable to have a surface having relatively moist touch or sticky touch.

The plastic article of the present invention is preferably a container for packaging, for instance, cosmetics, medicines and foods. Preferred examples thereof also include a hanger, a window dummy, a toy, a sporting good and a variety of grips.

The plastic article of the present invention may completely be constituted from a styrenic thermoplastic elastomer or an olefinic thermoplastic elastomer, or a blend of a styrenic or olefinic thermoplastic elastomer with a polyolefin, but only the surface portion thereof may be constituted from the foregoing elastomer material or a blend thereof and the remaining portion thereof may be formed from other widely used plastic materials, in order to reduce the production cost.

For instance, the internal layer of the container is constituted from a widely used plastic material such as a low-density polyethylene, a high-density polyethylene or a polypropylene, while the external layer thereof is constituted from a styrenic thermoplastic elastomer or an olefinic thermoplastic elastomer, or a blend of a styrenic or olefinic thermoplastic elastomer with a polyolefin. In this case, the thickness of the external layer in general ranges from 100 to 600 $\mu$m, preferably 300 to 400 $\mu$m and more preferably 330 to 370 $\mu$m.

The plastic article of the present invention can be prepared by the usual molding method such as hollow casting and blow molding methods. It is in general desirable to control the molding temperature to the range of from 170 to 200° C. and preferably about 180 to 190° C. In addition, when different plastic materials are used for forming the internal and external layers, an adhesive layer may be arranged between these internal and external layers, as an intermediate layer to thus give a container having a three-layer structure. Materials for the adhesive layer may appropriately be selected while taking into consideration the kinds of the plastic materials for the internal and external layers.

EXAMPLE 1

There were blended a polystyrene-polybutadiene-polystyrene type thermoplastic elastomer ("RABARON" (Grade MB6302C) available from Mitsubishi Chemical Co., Ltd.) and a polypropylene ("CHISSO POLYPRO, Grade: XK6004" available from Chisso Corporation) in a weight ratio of 3:1, 2:1 or 1:1.

The resulting blend as a material for the external layer and a high-density polyethylene as a material for the internal layer were molded, at a molding temperature of 180° C., into a container for cosmetics having a thickness of 1000 µm for the internal layer and 200 µm for the external layer (the foregoing blend) and a predetermined size (i.e., a diameter of 58.5 mm, a height of 137 mm and an overall thickness of 1200 µm), using a multi-layer hollow molding machine (TB-SW-7P) available from a limited responsibility company: Suzuki Tekko.

As a result, it was found that the container prepared using the blend having a ratio: styrenic thermoplastic elastomer/polypropylene of 3:1 had highly moist feel or touch, the container prepared using the blend having such a ratio of 2:1 had moderately moist touch and the container prepared using the blend having such a ratio of 1:1 exhibited relatively dry touch.

EXAMPLE 2

A polystyrene-polybutadiene-polystyrene type thermoplastic elastomer ("RABARON" (Grade MB6302C) available from Mitsubishi Chemical Co., Ltd.) as a material for the external layer and a high-density polyethylene as a material for the internal layer were molded, at a molding temperature of 180° C., into a container for cosmetics having a thickness of 1000 µm for the internal layer and 200 µm for the external layer (the foregoing blend) and a predetermined size (i.e., a diameter of 58.5 mm, a height of 137 mm and a thickness of 1200 µm), using a multi-layer hollow molding machine (TB-SW-7P) available from a limited responsibility company: Suzuki Tekko.

As a result, it was found that the surface of the resulting container possessed highly moist feel or touch.

EXAMPLE 3

An olefinic thermoplastic elastomer ("THERMOLANE (registered trademark)" available from Mitsubishi Chemical Co., Ltd.) as a material for the external layer and a high-density polyethylene as a material for the internal layer were molded, at a molding temperature of 180° C., into a container for cosmetics having a thickness of 1000 µm for the internal layer and 200 µm for the external layer (the foregoing blend) and a predetermined size (i.e., a diameter of 58.5 mm, a height of 137 mm and a thickness of 1200 µm), using a multi-layer hollow molding machine (TB-SW-7P) available from a limited responsibility company: Suzuki Tekko.

As a result, it was found that the surface of the resulting container exhibited highly moist feel or touch.

The container of the present invention has moist touch, which differs from the smooth touch peculiar to the conventional plastic articles, and therefore, it can be suitably used as a container for packaging, for instance, cosmetics, medicines and foods. Moreover, it is also preferably used as, for instance, a hanger, a window dummy, a toy, a sporting good and a variety of grips.

What is claimed is:

1. A molded plastic container for packaging comprising an external layer and an internal layer, wherein:
   the external layer consists essentially of a polystyrene-polybutadiene-polystyrene thermoplastic elastomer, an olefinic thermoplastic elastomer or a blend of a polystyrene-polybutadiene-polystyrene thermoplastic elastomer and a polyolefin;
   the external layer has a thickness of from 100 µm to 600 µm;
   the internal layer consists essentially of a polyethylene, a polypropylene or a polyethylene-propylene; and
   the container has a predetermined size.

2. The molded plastic container for packaging of claim 1, wherein the external layer consists essentially of a blend of a polystyrene-polybutadiene-polystyrene thermoplastic elastomer and a polyolefin.

3. The molded plastic container for packaging of claim 2, wherein the external layer consists essentially of a blend of 1 to 3 parts by weight of a polystyrene-polybutadiene-polystyrene thermoplastic elastomer and one part by weight of a polyolefin.

4. The molded plastic container for packaging of claim 3, wherein the external layer consists essentially of a blend of 1 to 3 parts by weight of a polystyrene-polybutadiene-polystyrene thermoplastic elastomer and one part by weight of a polypropylene.

5. The molded plastic container for packaging of claim 1, wherein the external layer consists essentially of a polystyrene-polybutadiene-polystyrene thermoplastic elastomer.

6. The molded plastic container for packaging of claim 1, wherein the internal layer consists essentially of a polyethylene.

7. The molded plastic container for packaging of claim 1, wherein the container is suitable for containing a cosmetic, medicine or food.

* * * * *